United States Patent

Blacket et al.

[11] Patent Number: 5,813,114
[45] Date of Patent: Sep. 29, 1998

[54] FASTENING TOOL INCLUDING FASTENER-SUPPORTING NODES IN THE NOSE THEREOF

[75] Inventors: Stuart Edmund Blacket, Closeburn; Ralph Fuhrmeister, Runcorn, both of Australia

[73] Assignee: Henrob Ltd., Clwyd, United Kingdom

[21] Appl. No.: 464,855

[22] PCT Filed: Jan. 7, 1994

[86] PCT No.: PCT/AU94/00013

§ 371 Date: Jul. 6, 1995

§ 102(e) Date: Jul. 6, 1995

[87] PCT Pub. No.: WO94/15736

PCT Pub. Date: Jul. 21, 1994

[30] Foreign Application Priority Data

Jan. 7, 1993 [AU] Australia .................. PL6704

[51] Int. Cl.⁶ ................................... B23Q 7/10
[52] U.S. Cl. ............... 29/809; 227/119; 227/149
[58] Field of Search ............... 29/800; 227/149, 227/119

[56] References Cited

U.S. PATENT DOCUMENTS

| | | | |
|---|---|---|---|
| 2,244,048 | 6/1941 | Butter | 227/149 |
| 2,538,895 | 1/1951 | Brennan | 227/149 |
| 2,901,749 | 9/1959 | Crossen et al. | 227/149 |
| 3,250,451 | 5/1966 | Fulop | 227/149 |
| 4,615,475 | 10/1986 | Fuhrmeister | 227/136 |
| 4,819,856 | 4/1989 | Davern et al. | 227/149 |
| 5,181,315 | 1/1993 | Goodsmith | 227/149 |
| 5,398,860 | 3/1995 | Edwards | 227/149 |

FOREIGN PATENT DOCUMENTS

| | | |
|---|---|---|
| 28506/84 | 11/1984 | Australia . |
| 0 113 421 | 7/1984 | European Pat. Off. . |
| 0 387 430 | 9/1990 | European Pat. Off. . |
| 0 547 638 | 6/1993 | European Pat. Off. . |
| 247895 | 6/1912 | Germany ............... 227/149 |
| 38 02 154 | 8/1989 | Germany . |
| 41 32 504 | 4/1992 | Germany . |
| 1506398 | 4/1978 | United Kingdom . |
| 93/09918 | 5/1993 | WIPO . |

*Primary Examiner*—David P. Bryant
*Attorney, Agent, or Firm*—Foley & Lardner

[57] ABSTRACT

A fastening machine (1) includes a guide block (11) with a rivet delivery passage (12). Rivets (17) are supplied from a source via a tube (22) and are delivered through a rivet supply passage (20) to the rivet delivery passage. The rivet delivery passage includes a plurality of spring-loaded balls (60) on the inside thereof to maintain the heads of the rivets in alignment with a punch (16).

39 Claims, 13 Drawing Sheets

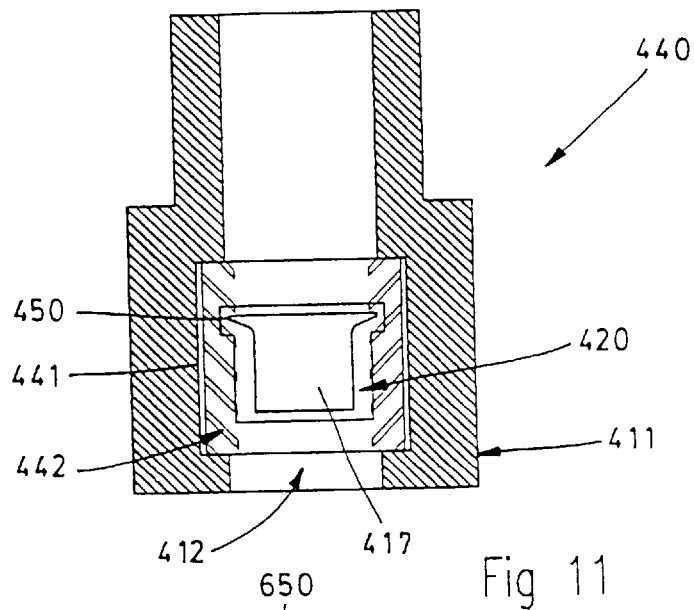
Fig 11
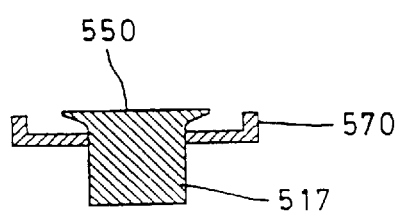
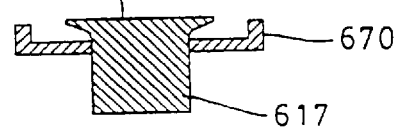
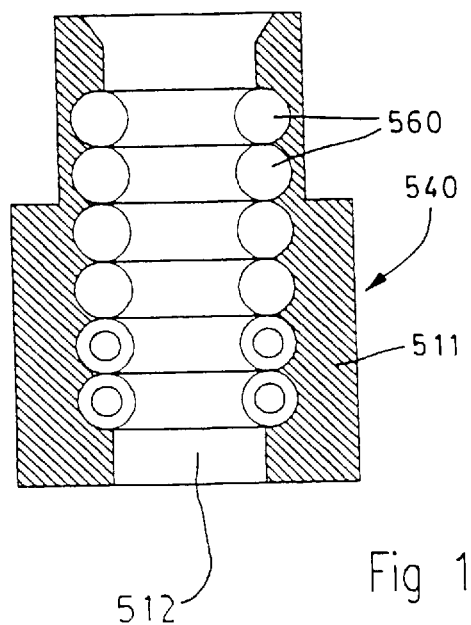
Fig 12
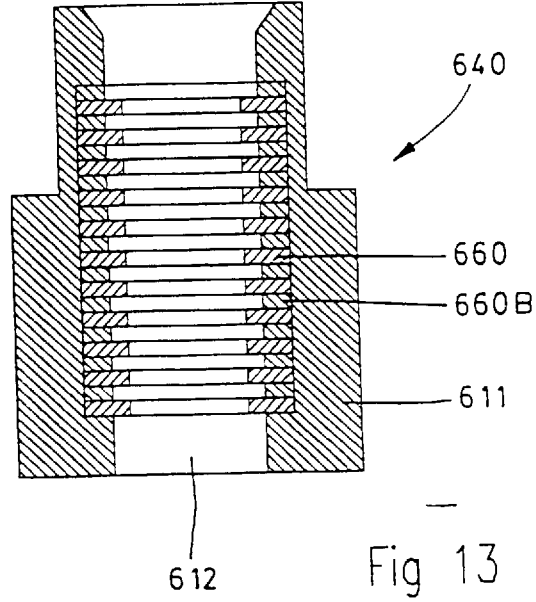
Fig 13

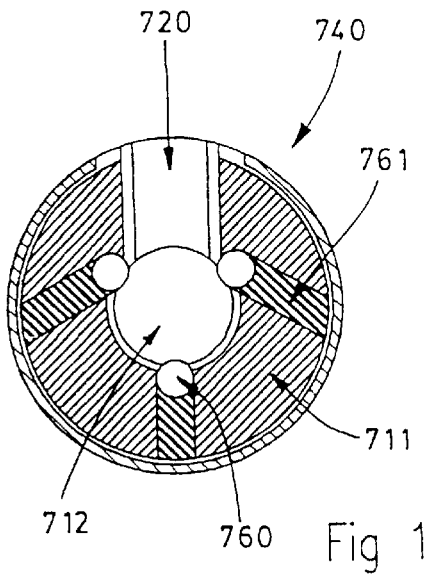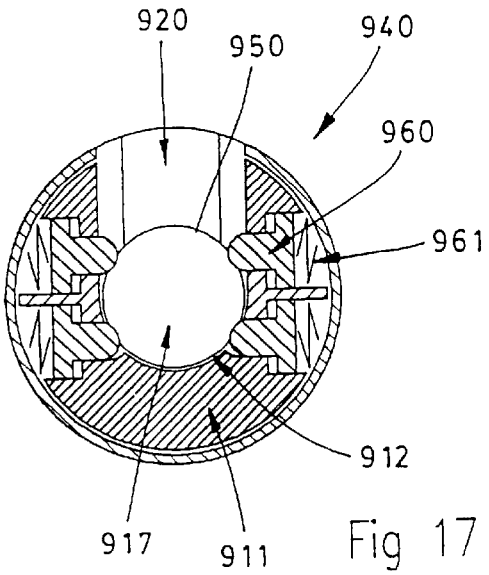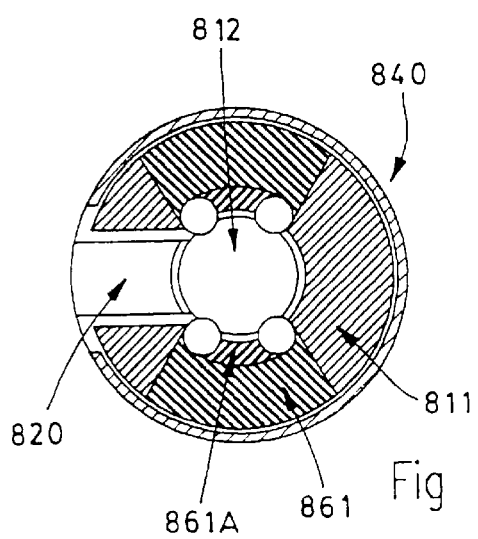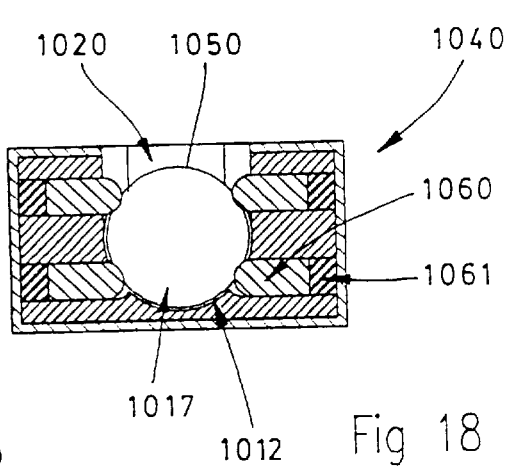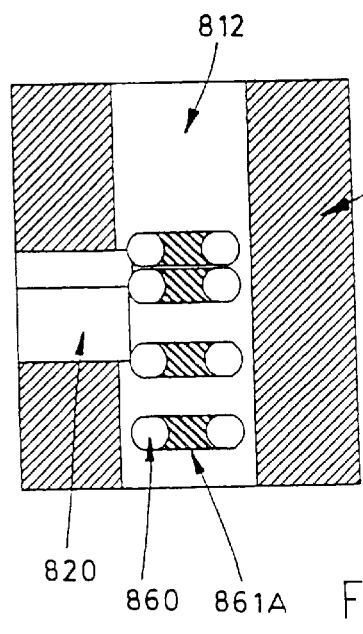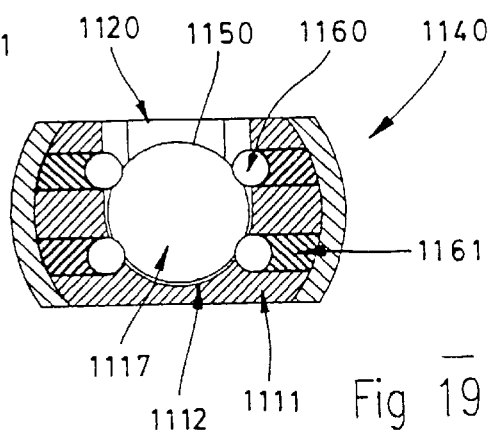

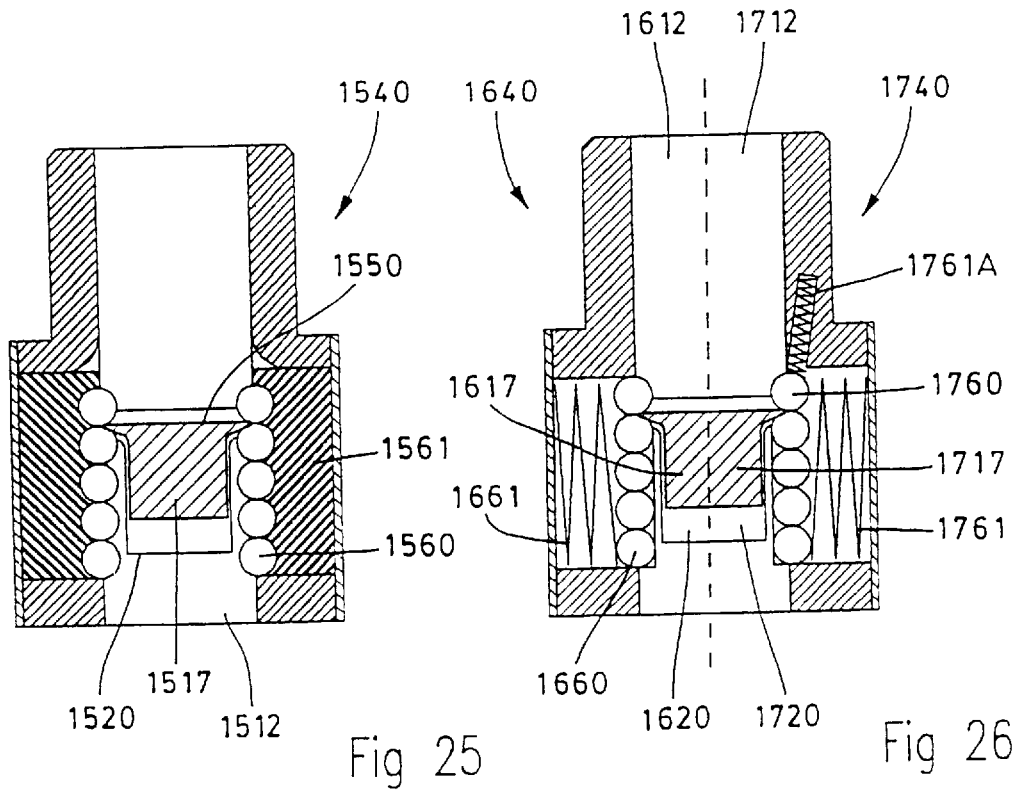
Fig 25　Fig 26
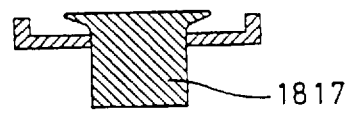
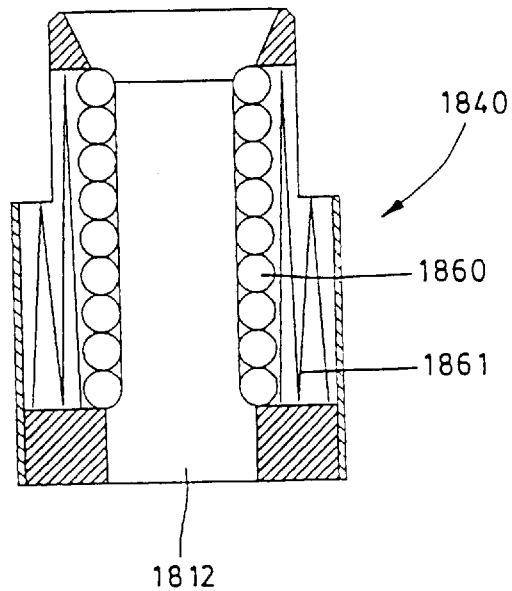
Fig 27

FASTENING TOOL INCLUDING FASTENER-SUPPORTING NODES IN THE NOSE THEREOF

FIELD OF THE INVENTION

THIS INVENTION relates to improved setting tools for fastening machines and in particular to improvements in the nose assembly of the setting tool whereby fasteners are delivered to a work piece.

BACKGROUND OF THE INVENTION

U.S. Pat. No. 4,615,475 (Fuhrmeister) (=AU-B-28506/84 (566811)=International Publication No. WO84/04710) discloses a feeder for headed fasteners, where the fasteners, mounted in tape, are sequentially advanced into alignment with the punch and die assembly of a fastening machine by an oscillating actuator, which is timed by the plunger holding the punch, the actuator releasably engaging the stems of the fasteners to advance the fasteners.

The feeder, and the fastening machine, has proved commercially successful in a wide range of industries. There are certain applications, however, eg. in the automotive and white goods industries, where the dimensions of the feeding head preclude the use of the above described type of fastening machine to fasten components together, where limited space is available.

In addition, the minimum radius of curvature of the tape entering and leaving the feeder head also limits the reduction of size of the feeder hereinbefore described to suit such applications.

SUMMARY OF THE INVENTION

It is an object of the present invention to provide a setting tool with an improved means of supporting the fasteners as they are engaged by the punch in a fastening machine and to be urged thereby into engagement with the work pieces to be fastened.

It is a preferred object of the present invention to provide an improved nose assembly for the fastening machine which enables the fastening machine to be used in confined spaces in conjunction with high clamping loads whenever needed.

It is a still further preferred object to be able to feed and support fasteners which are smaller in length than diameter and need to be guided and/or oriented during the fastening process.

Other preferred objects will become apparent from the following description.

The term "fastener" shall include rivets, screws and other like fastening devices.

The term "fastener actuator" includes a punch when the fastener is a rivet, a driver when the fastener is a screw, that is, the tooling appropriate to insert or apply the fastener after its delivery by the nose assembly.

The term "stem" of a fastener shall be hereinafter used to also include a "shank" of a fastener.

The term "fastener support means" includes means which guide or orient an advancing rivet as occurs in the tape feed machines hereinbelow where initial support is by the tape and the term includes means which engage either or both of the head and stem of an advancing fastener.

The support is not intended to be only a static function but it is also to refer to the dynamic engagement of the means with an advancing fastener.

In a broad aspect, the present invention resides in a setting tool for a fastening machine, which fastening machines includes:

a nose piece with a fastener delivery passage therein and a fastener feed mechanism to advance fasteners to the delivery passage;

a fastener actuator slidably mounted for movement through the delivery passage to move a fastener therefrom to a work piece to be fastened thereby; and means operable to advance the fastener actuator through the fastener delivery passage to delivery fasteners therefrom at an opening in an end thereto;

the setting tool operable with or without a preclamp function;

characterised in that:

fastener support means is provided at, or on the side wall of, the fastener delivery passage to guide and/or maintain orientation of the fastener whilst the fastener is moved therethrough by the advancing fastener actuator.

Preferably, the frame is a C-type frame with a fastener upsetting die mounted on one jaw and the setting tool mounted on the other jaw and connected to an actuator.

Preferably, the means to advance the punch is a plunger, operated by an hydraulic cylinder.

The fastener supply passage may have its axis perpendicular, or axially inclined, relative to the axis of the fastener delivery passage; and resilient or retractable stop means may be provided in the delivery passage to prevent a fastener from re-entering the supply passage.

Sensor means, eg. a limit switch, proximity switch or light beam may be provided to detect when a fastener has been delivered to the delivery passage for engagement by the punch.

The supply passage may be connected to the delivery passage at or adjacent to the fastener support means, or at a location interposed between the fastener support means and the punch when the latter is in its retracted position.

The fastener support means may releasably engage the head and/or stem of the fastener when the fastener enters the delivery passage and may support the fastener until it is engaged by the advancing punch, or may support the fastener from engagement by the advancing punch up to, or until, the fastener engages the work pieces to be fastened.

The setting tool may incorporate, or be provided with, preclamping means to clamp the work pieces to the die before the fastener engages and pierces the work pieces.

BRIEF DESCRIPTION OF THE DRAWINGS

To enable the invention to be fully understood, a number of preferred embodiments will now be described with reference to the accompanying drawings, in which:

FIG. 11 is a side elevational view of a first embodiment of the fastener support means in a fastening machine;

FIGS. 12 and 13 are sectional side views of respective second and third embodiments of the fastener support means;

FIG. 14 is a sectional top plan view of a fourth embodiment;

FIGS. 15 and 16 are respective sectional top plan and side views of a fifth embodiment of the fastener support means;

FIGS. 17 to 19 are respective sectional top views of sixth to eighth embodiments of the fastener support means;

FIGS. 23 to 25 are respective sectional side views of tenth to twelfth embodiments of the fastener support means;

FIG. 26 is a split sectional side view of thirteenth and fourteenth embodiments of the fastener support means;

FIGS. 27 to 29 are respective sectional side views of fifteenth to seventeenth embodiments of the fastener support means;

DETAILED DESCRIPTION OF THE PREFERRED EMBODIMENTS

The invention is described below in connection with rivet fastening machines. However, it will be clear that the mechanisms described by which to apply a rivet could equally be applied to a screw and other like type fasteners. The punch of the preferred embodiments below is then replaced with the appropriate fastener tooling.

Figure 1:
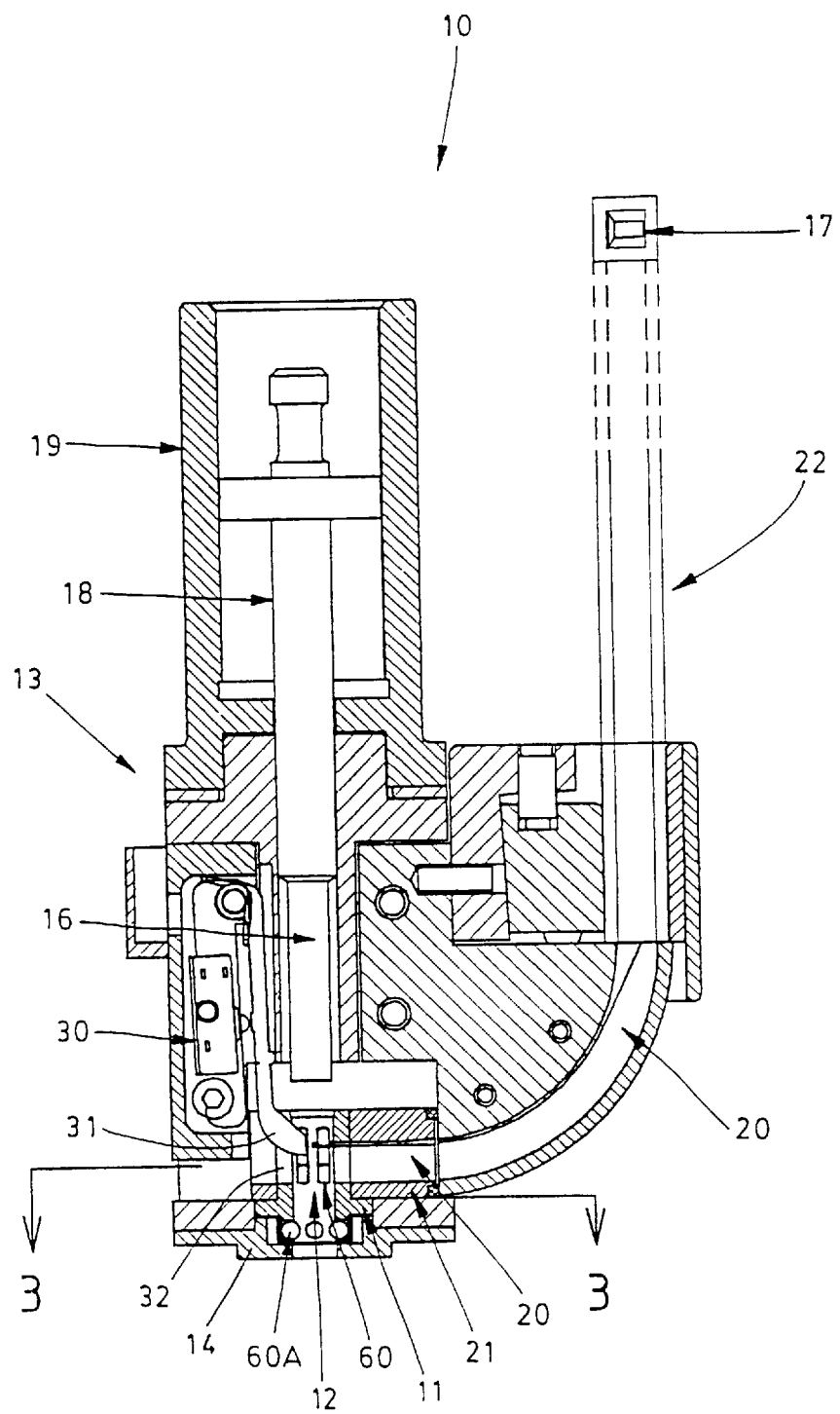
FIG. 1 is a sectional side view of a first embodiment showing the nose assembly of the setting tooling of a fastening machine.
Figure 2:
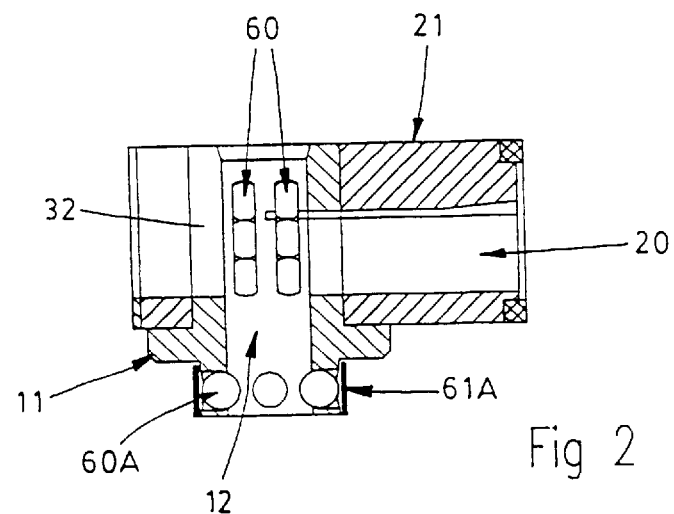
FIG. 2 is sectional side view of a portion of FIG. 1 on an enlarged scale.
Figure 3:
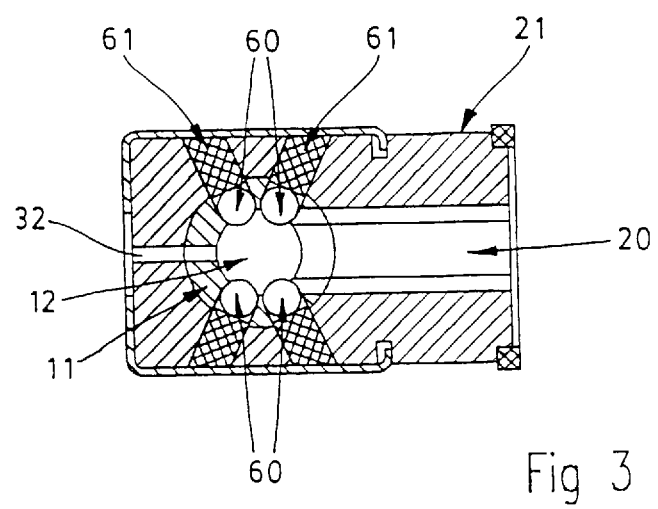
FIG. 3 is a sectional plan taken on line 3—3 on FIG. 1.
Figure 4:
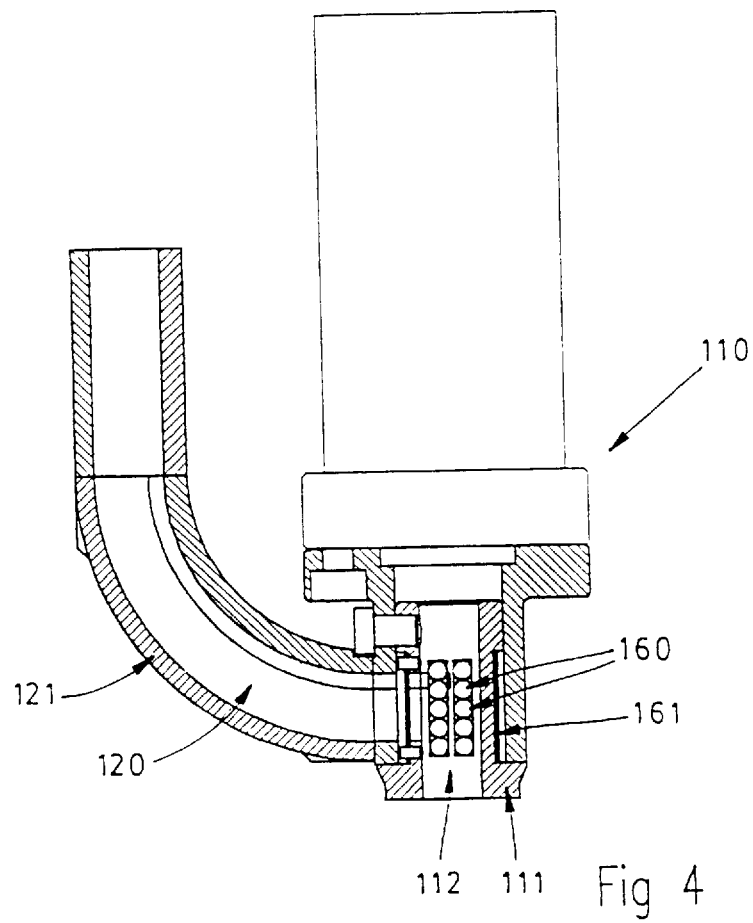
FIG. 4 is a sectional side view of a second embodiment of the fastening machine.
Figure 5:
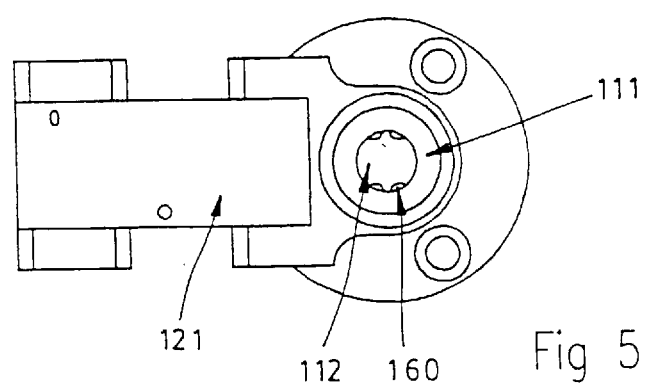
FIG. 5 is a bottom plan view taken of the machine of FIG. 4.

Referring to FIGS. 1 to 3, the fastening machine has a setting tool 10 which has a nose assembly tooling 13. The machine may have a C-frame (not shown) with a rivet upsetting die (also not shown) mounted appropriately as will be clear to those skilled in the art. The fastening machine may be operated with a preclamp function as will be clear to the man in the art.

The rivet upsetting die is mounted on one jaw of the C-frame in alignment with the punch (to be hereinafter described) and the nose assembly tooling 13 is mounted on the other jaw of the C-frame.

A nose piece, block or guide bush 11 has a rivet delivery passage 12 co-axially aligned with the die, and has a foot plate 14 (see FIG. 1) by which to preclamp the work pieces to the die prior to riveting.

A punch 16 is slidably received in the delivery passage 12 to be advanced to cause each rivet 17 to engage and pierce respective work pieces and be upset by the die, the punch 16 being advanced by a plunger 18 in an inner cylinder 19.

A fastener supply passage 20, with a T-shaped, rectangular or other profiled section is provided in this embodiment in a side extension 21 on the nose piece, block or guide bush 11 at its upstream end and is connected to a fastener guide tube 22. As shown in FIG. 1, the rivet 17 passes down the supply passage 20 and enters the delivery passage 12 in a direction perpendicular to the latter. The rivet 17 is supported by a fastener support means to be hereinafter described and is engaged and advanced by the punch 16 towards the work pieces to be joined together. Alternately, rivets may be fed to the fastener delivery passage by a tape as will be seen in detail below.

A plurality of balls 60 or the like are arranged in vertical columns, preferably three balls high in this embodiment, in the delivery passage 12, and each ball 60 is urged inwardly by a resilient rubber (or plastic) block 61 (see FIG. 3). The balls 60 engage the head of the rivet 17 so that the rivet is supported centrally in the rivet delivery passage 12, with its head surface parallel to the contact face or nose of the punch 16. Other mechanisms besides the balls are described below as a means to guide and orient the rivet as it passes through the delivery passage. The balls, in addition to guiding and/or orienting the rivet, also engage and hold the rivet on its delivery to the fastener delivery passage prior to engagement with the punch.

A secondary set of balls 60A at the bottom of the rivet delivery passage 12 may be provided to engage the stem or the head of the rivet 17 to centralise the rivet. The secondary set of balls 60A may be positioned so as to engage the stem of the rivet 17 before its head is released by the lowermost balls 60, thereby preventing the rivet from tumbling. A "Tensator" (trade mark) spring 61A (see FIG. 2) can be used to urge the balls 60A inwardly, whilst allowing the rivet 17 and punch 16 to pass.

A limit switch 30 is mounted in the riveting head 13 and has a finger 31 which passes through a slot 32 in the guide bush 11. When a rivet 17 is delivered to the rivet delivery passage 12, it engages the finger 31, and the limit switch sends a signal to the controller (not shown) for the fastening machine 10 that the punch 16 may now be advanced to engage the rivet 17 and drive it towards the work pieces (and die). As will become clear below, the nose piece or guide bush 11 can be axially extended with reduced cross section to create a setting tool which can access confined spaces requiring that geometry. The nose piece can be elongated and can be constructed with the strength to produce a required preclamp force. Short shank rivets can be fed along the delivery passage without tumbling to effect proper operation in all geometries of the setting tool.

Referring now to FIGS. 4 to 7, the riveting machine 110 has a nose piece, block or guide bush 111 with a rivet delivery passage 112, and a rivet supply passage 120 in extension 121.

Figure 6:
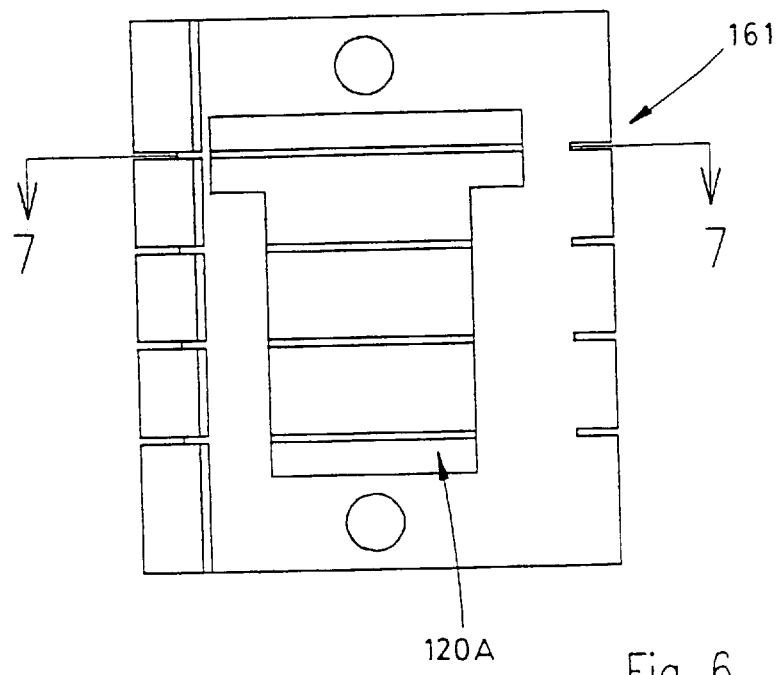
FIG. 6 is a front view of the "Tensator" spring in the machine of FIG. 4.
Figure 7:
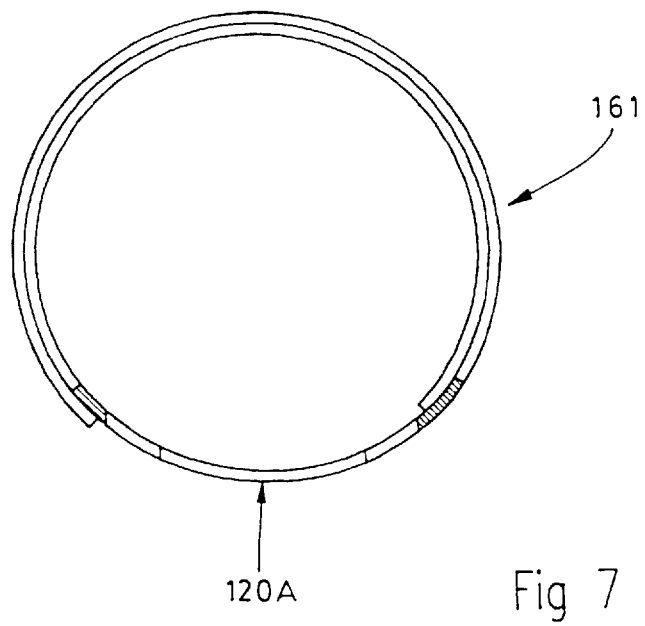
FIG. 7 is a sectional view taken on line 7—7 on FIG. 6.

The balls 160 are urged into the rivet delivery passage 112 by a "Tensator" spring 161 or rubber or polymeric, elastomeric sheet (see FIGS. 6 and 7). A Tee-shaped slot 120A can be formed in one face to conform with the rivet supply passage 120 and thereby allow the rivets to enter the rivet delivery passage 112.

Figure 8:
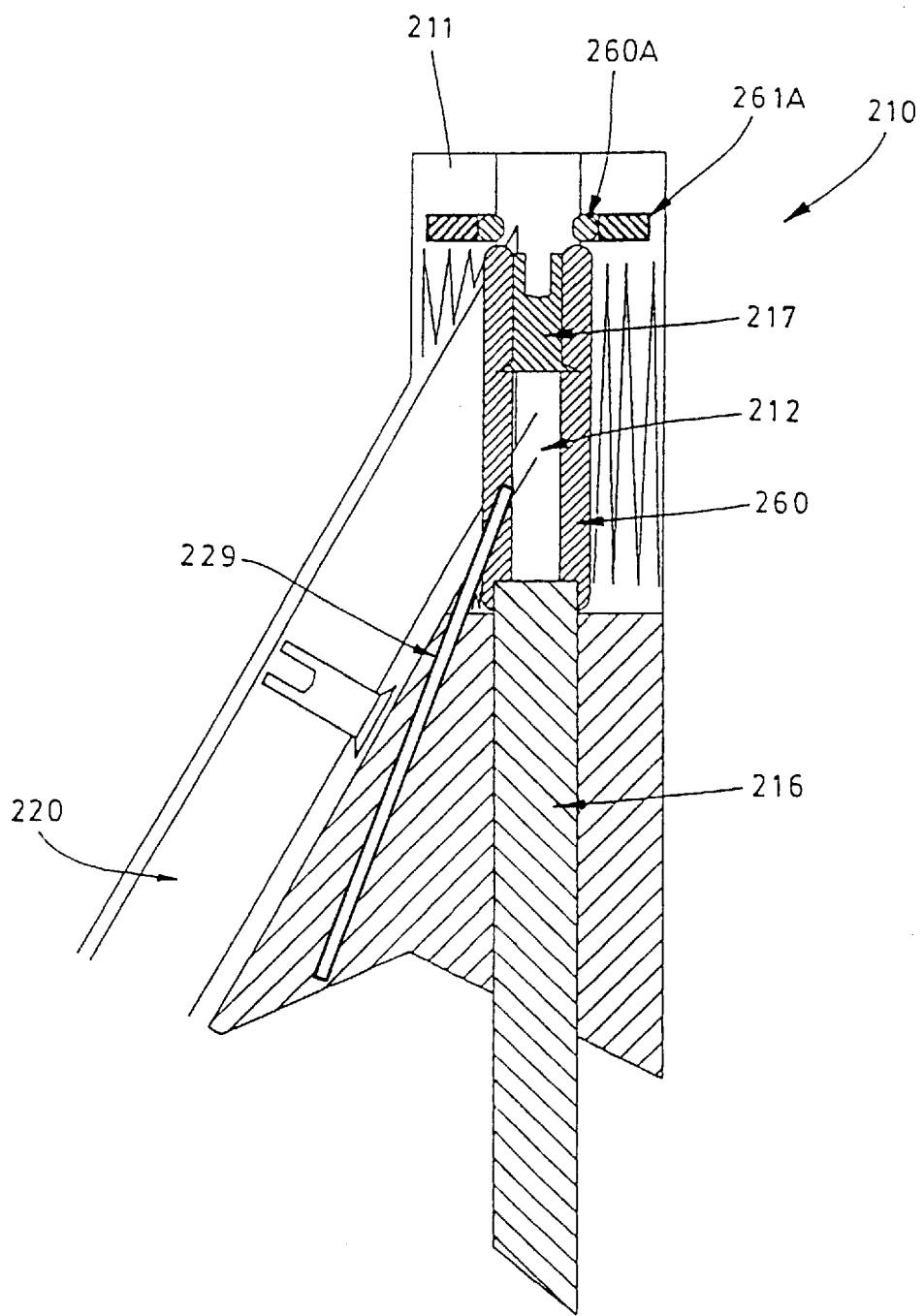
FIG. 8 is a sectional side view of a third embodiment of the fastening machine.

In the embodiments of FIGS. 1 to 3 and 4 to 7, the supply passages 20, 120 are perpendicular to the delivery passages 12, 112. As shown in FIG. 8, the supply passage 220 may be acutely inclined relative to the nose piece or guide bush 211 and delivery passage 212. Pins (or balls) 260 to be hereinafter described, engage and support the rivet 217 in the delivery passage 212 until engaged by the punch 216.

In certain applications, the rivets 217 will be blown up the supply passage 220, where the die is above the punch 216

(see FIG. 8). To prevent the rivets 217 from re-entering the supply passage 220 under gravity, a leaf spring 229 extends into the supply passage 220 and the delivery passage 212, the leaf spring 229 and the pins or balls 260 being deflected to one side as the rivet is blown from the supply passage into fastener delivery passage 212.

Balls 260A (with springs or resilient blocks 261A) restrain the rivet 217 from being blown out of the rivet delivery passage 212 and also centralise the rivet 217 as it is advanced by the punch 216.

Figure 9:
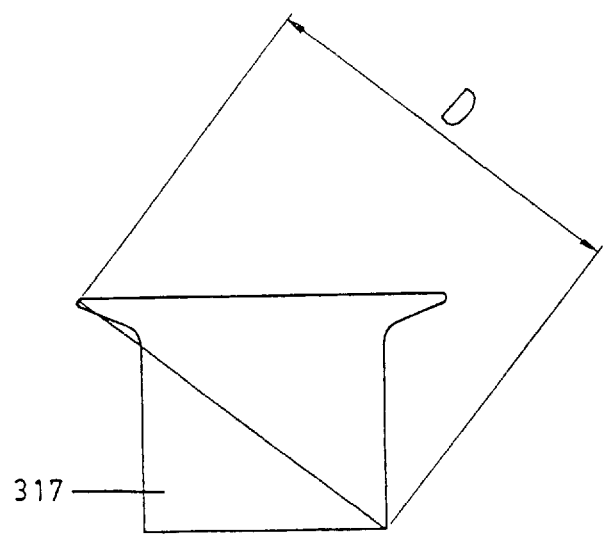
FIGS. 9 and 10 show the relative dimensions of a rivet and a guide therefor.
Figure 10:
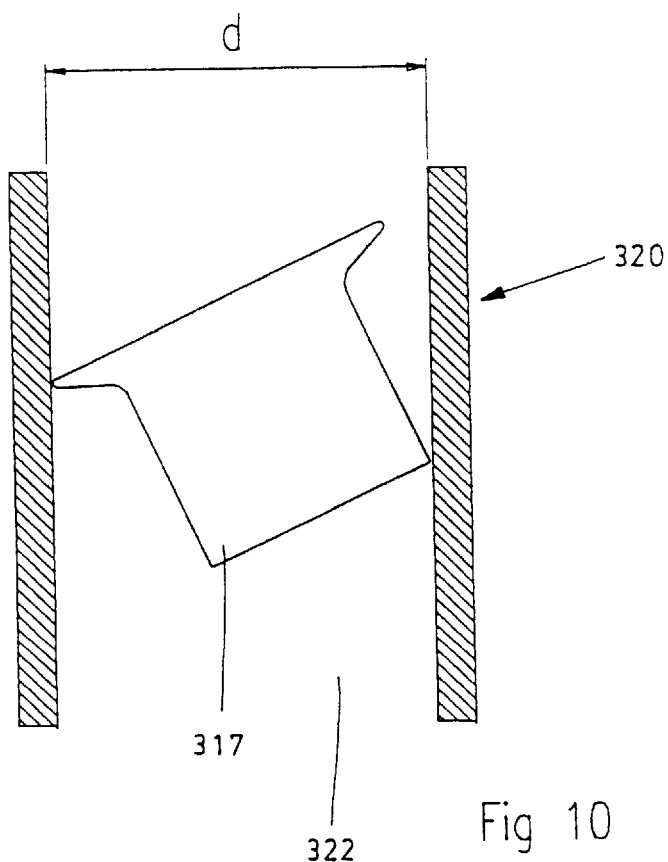

As shown in FIGS. 9 and 10, a rivet 317 (FIG. 9), with a diagonal dimension D (eg. 8.1 mm) will not tumble when passed through a tube 320 with a bore or passage 322 of smaller dimension d (eg. 8.0 mm) (FIG. 10). Conversely, a rivet with a smaller diagonal dimension D than the tubular bore d through which it passes must be so contained as to prevent the rivet from tumbling.

Referring now to FIG. 11, a particular embodiment of the rivet (fastener) support means or nose assembly 440 will now be described.

The nose piece, block or guide bush 411 has its delivery passage 412 connected to the side entry supply passage 420.

An enlarged chamber 441 is provided in the delivery passage 412 and is lined with flexible filaments, hairs, bristles, fingers or the hook portion of "Velcro" (registered trade mark) fabric 442. The hooks (or "fingers") in the fabric 442 engage the head 450 and/or stem of rivet 417 until the rivet head 450 is engaged by the advancing punch (not shown) to create a gate effect. Steel balls as in FIG. 1 may be used to centralise the rivet.

Referring now to FIG. 12, the rivet support means 540 is arranged to support rivets 517 released from tape 570, by the punch, when the rivets 517 are aligned with the rivet delivery passage 512 in the nose piece, block or guide bush or block 511. The rivet head 550 engages a plurality of rubber O-rings 560 which maintain the alignment of the rivet 517 in the rivet delivery passage 512 as the punch is advanced. The tape 570 in the drawing extends perpendicular to the plane of the drawing and moves over the end of the nose assembly to feed rivets to the fastener delivery passage. The O-rings may be solid (as seen at the upper portion of the drawing) or hollow as seen at the bottom. Their nature will depend on the desired compression character wanted to achieve proper function.

In the support means 640 of FIG. 13, the O-rings 560 are replaced by annular, polymeric or other resilient rubber washers 660 (with spacers 606B) to engage the head 650 of rivet 617 as it passes through the rivet delivery passage 612 of the nose piece, guide bush or block 611, after being stripped from the tape 670.

FIG. 14 shows a support means 740, where rivets are supported by three vertical columns of balls 760 after entering the rivet delivery passage 720. Each ball 760, or column of balls 760, is supported by a rubber block 761 in the nose piece, guide bush or block 711. By angling the blocks 761 adjacent to the rivet supply passage 720, towards the other side of the delivery passage 712, less force is required to enable the rivet to enter the rivet delivery passage 712.

The support means 840 of FIGS. 15 and 16 has four columns of balls 860 provided in horizontal grooves and backed by rubber blocks 861 in the nose piece, block or guide bush or block 811. Secondary (softer) rubber blocks 861A separate the balls 860 in each groove. When a rivet enters the rivet delivery passage 812 from the rivet supply passage 820, the upstream balls 860 "roll" on rubber blocks 861, against blocks 861A, to allow the rivet entry, the balls 860 engaging the rivet head. Hence, the four columns of balls can move both radially and circumferentially. The spacing of the balls in FIG. 16 is possible when the spacing is not too great. When appropriate, the stem of a rivet will be caught to limit tilt. The spacing can be desirable as it can permit construction of a setting tool able to meet higher preclamp loads. The top two balls are adjacent so as to catch the rivet on its entry to the passage and hold it until the punch is advanced.

Referring now to FIGS. 17 to 19, in the rivet support means 940, 1040, 1140, the heads 950, 1050, 1150 of the rivets 917, 1017, 1117 may be engaged by vertical fingers or bars, or pins or rods, (or balls), 960, 1060, 1160, slidably mounted in the transverse passages in the nose pieces, blocks or guide bushes 911, 1011, 1111. The fingers/bars/pins/ rods (or balls) 960, 1060, 1160 are provided with respective springs or resilient blocks 961, 1061, 1161 which allow the rivets to enter the delivery passages 912, 1012, 1112 from the supply passages 920, 1020, 1120, and which allow the punches (not shown) to advance the rivets towards the dies. The fingers/bars/pins/rods/balls may also be mounted on radial passages.

Figure 20:
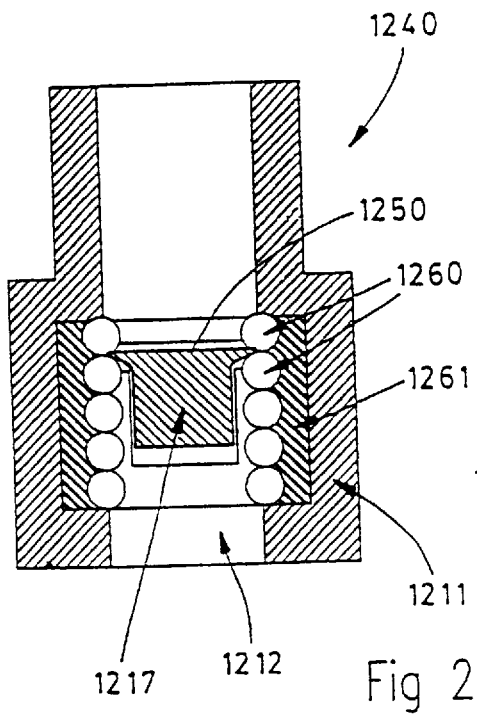
FIGS. 20 to 22 are respective side, end and plan sectional views of a ninth embodiment of the fastener support means.
Figure 21:
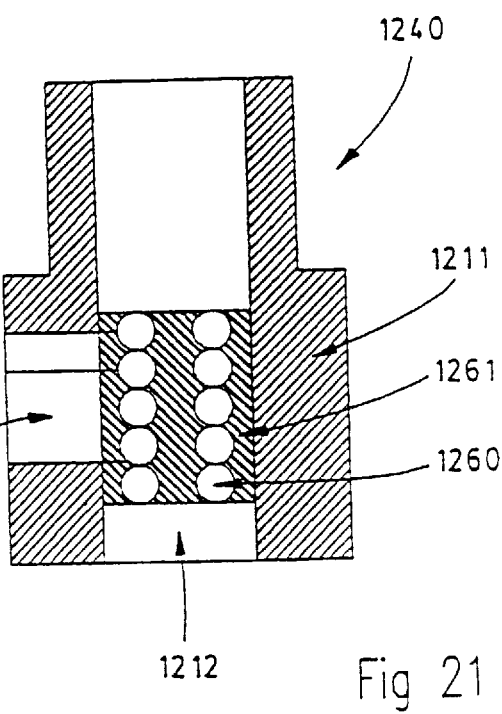
Figure 22:
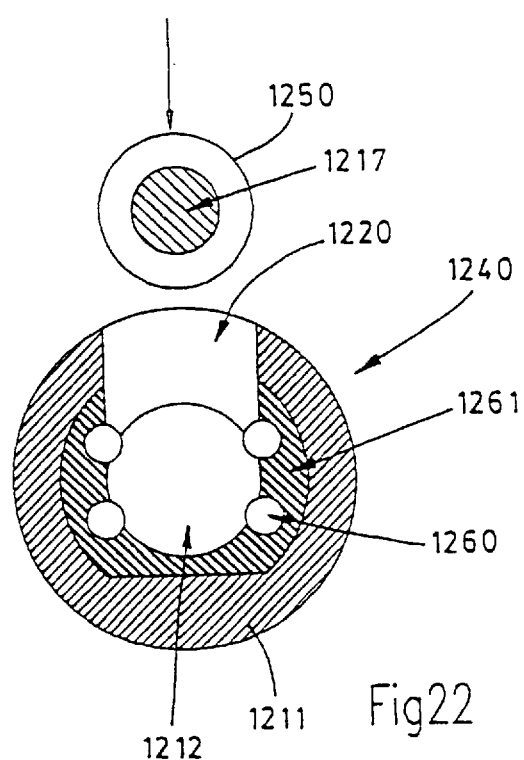

In the embodiment of the rivet support means 1240 in FIGS. 20 to 22, the balls 1260 are embedded in, or supported by, a block 1261 of resilient (elastomeric or polymeric) material in the nose piece, guide bush or block 1211, located in the rivet delivery passage 1212. The rivets 1217 (FIG. 20) enter via rivet supply passage 1220 (FIG. 21) and the head 1250 (FIG. 20) is engaged by the balls 1260.

In the embodiments of FIGS. 11–22, it is the heads of the rivets which are engaged by the rivet support means within the delivery passages, but it is possible to engage the stems together with the heads of the rivets to provide the alignment and guidance sought in the rivet delivery passages.

Figure 23:
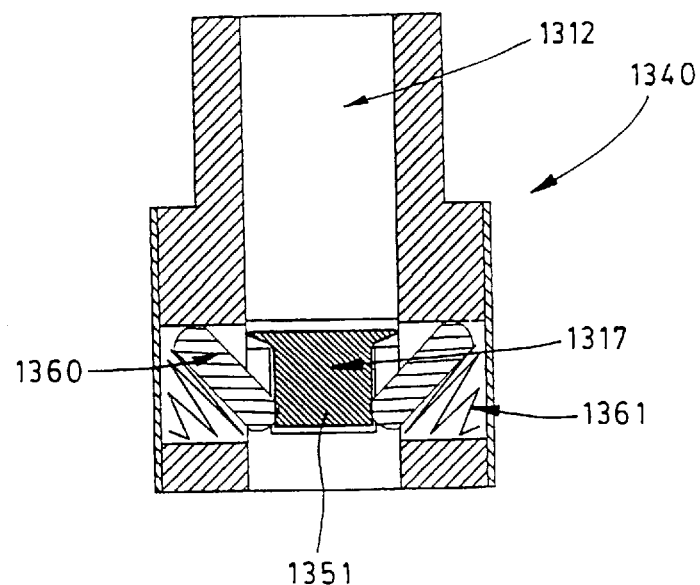
Figure 24:
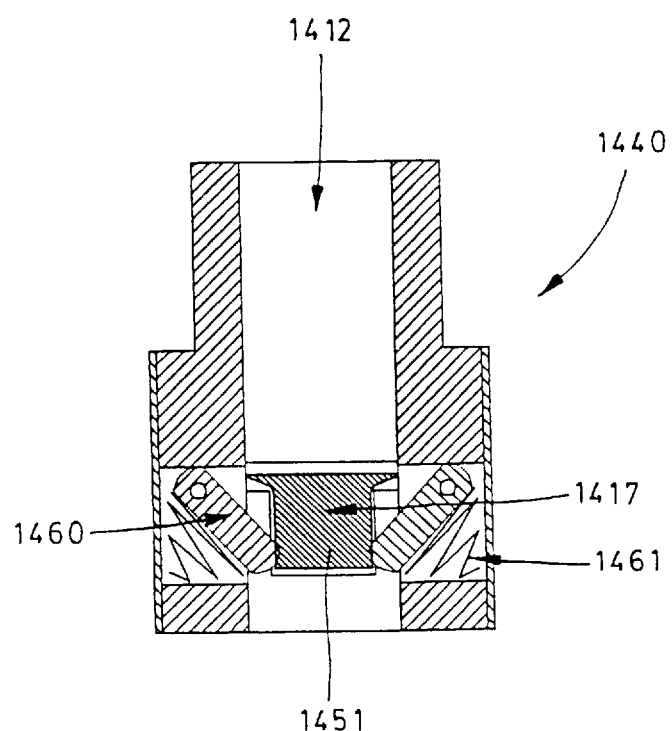

In the rivet support means 1340 and 1440 of FIGS. 23 and 24, the stems 1351, 1451 of the rivets 1317, 1417 are engaged by inclined fingers 1360, 1460 which can retract laterally (FIG. 23) or about a hinged axis (FIG. 24) (against springs 1361, 1461) when the punch engages and advances the rivets 1317, 1417 through the rivet delivery passage 1312, 1412.

FIG. 25 shows rivet support means 1540 where the balls 1560 are mounted against a resilient rubber block 1561 and held as before, projected etc. through a vertical slot. The uppermost of the balls 1560 may move upwardly on engagement with the head 1550 of the rivet 1517 when it enters the rivet delivery passage 1512 from the rivet supply passage 1520 because the shoulder of the nose piece at the top of the recess to receive the elastomeric block is cut back to permit the movement.

Figure 29:
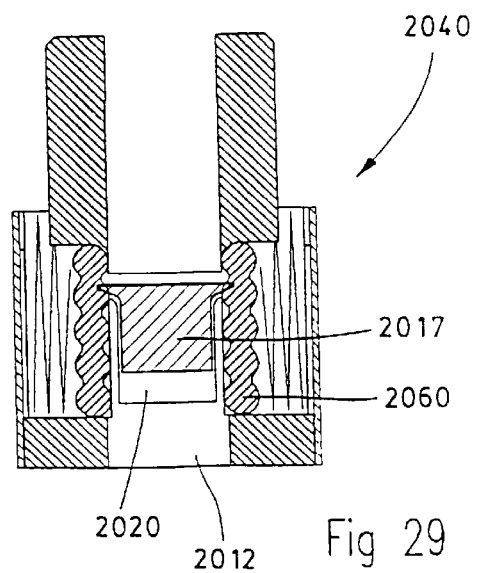
Figures 30, 31:
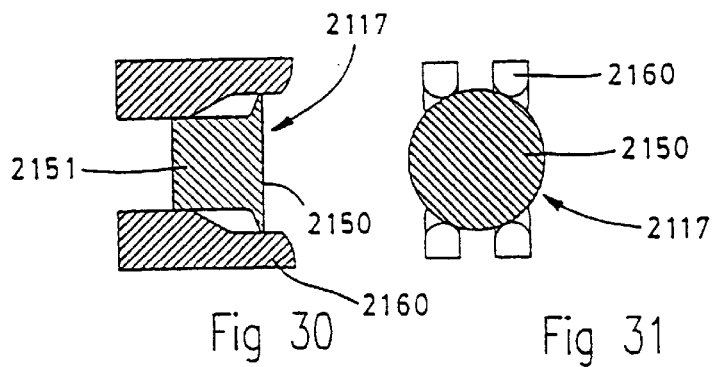
FIGS. 30 and 31 are respective side and plan views of an eighteenth embodiment of the fastener support means.
Figures 32, 33:
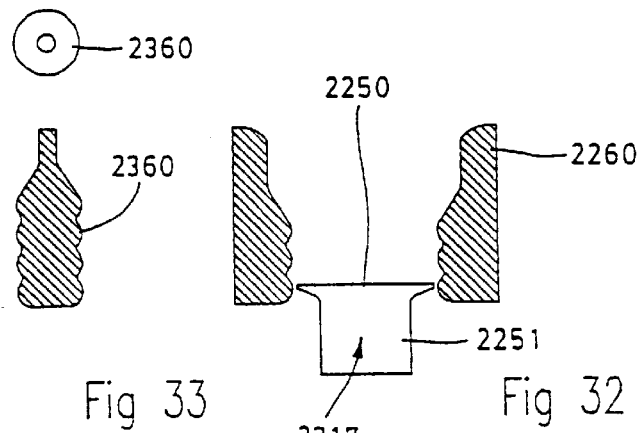
FIGS. 32 and 33 are side views of alternative pin profiles for the eighteenth embodiment of the fastener support means.

As shown in the rivet support means 1640 (LHS of FIG. 26), 1740 (RHS of FIG. 26) and 1840 of FIGS. 26 and 27, the heads and/or stems of the rivets 1617, 1717 and 1817 may be engaged by pins (not actually shown in this embodiment) and/or balls 1660, 1760, 1860, the balls (or annular grooves on the pins as seen in FIG. 29) resisting any tendency for the rivets to tilt in the delivery passages 1612, 1712, 1812 before they are engaged by the punches (not shown). The balls 1660, 1760, 1860 are backed by respective springs 1661, 1761, 1861. In support means 1740, the uppermost balls 1760 may move upwardly against secondary springs 1761A when the rivet 1717 is received from the rivet supply passage 1720.

In FIG. 27, rivet 1817 is fed by a tape feed to a point over passage 1812 when a punch may drive it as before. To achieve guidance, the balls (or pins or the like) 1860 extend the length of the passage up to the tape held rivet. Springs (or like type biassing means) 1861 provide the resilient character to the balls to complete the nose assembly 1840.

In an embodiment not shown, the pins or balls above the rivet head may be retracted upwardly by action of an air blast, solenoid, or other means, before the rivet enters the rivet support means to enable the rivet to enter with less force/inertia than would otherwise be required so providing for rivets of lower mass to be delivered reliably.

Figure 28:
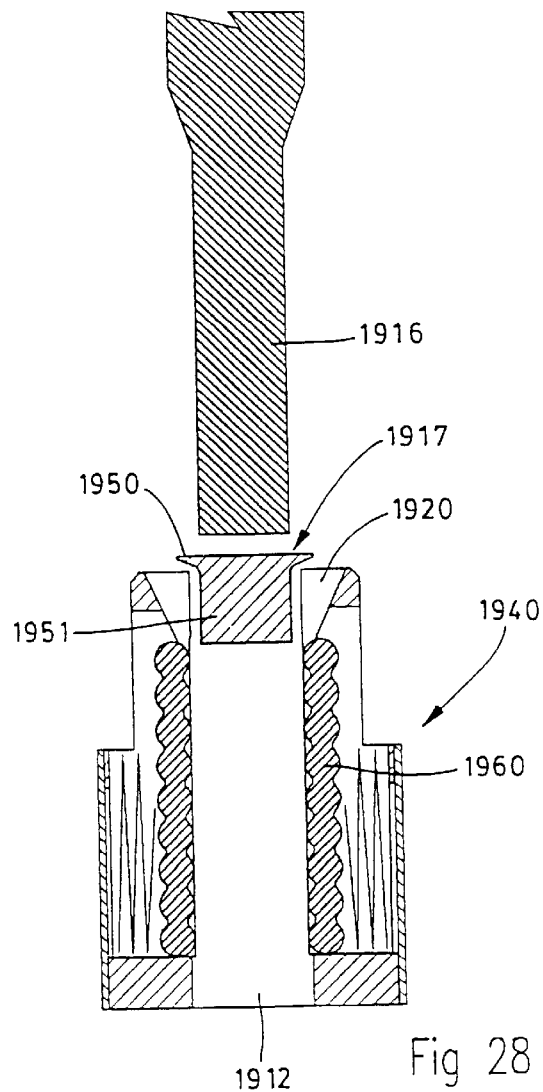

In all of the above embodiments of the rivet support means (with the exception of FIGS. 12, 13, 27 and 28), the rivets enter the delivery passage from the supply passage at the level of the supporting pins/balls/fingers, etc. As shown in the embodiment of FIG. 28, the nose assembly 1940 is supplied with rivets at a point above the pins (or balls) 1960, the rivets 1917 entering the delivery passage 1912 and dropping into engagement with the corrugated pins (or balls) 1960 prior to engagement by the punch 1916.

This embodiment may be particularly suitable for long rivets, screws or the like when the stems 1951 will initially engage the pins 1960 before the head 1950. The embodiment is also advantageous for short (and therefore lower mass) fasteners—since the entry resistance of the fastener into the delivery passage is lower and the drop of the fastener into full engagement with the pins or balls 1960 provides insufficient room for the fastener to tumble.

The support means 2040 of FIG. 29 shows that corrugated pins 2060 can be used to support rivets 2017 when delivered to a rivet delivery passage 2012 by a side rivet supply passage 2020.

As shown in FIGS. 30 to 34, the pins 2160, 2260, 2360 can engage and support both the heads 2150, 2250 and stems 2151, 2251 of the rivets 2117, 2217 before engagement by the punches.

Figure 34:
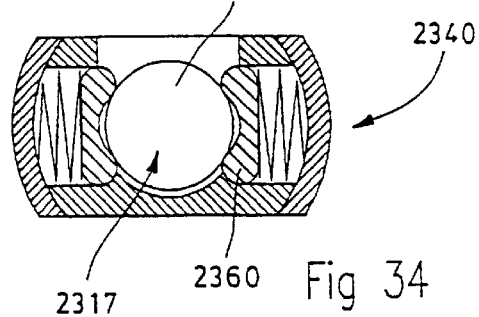
FIG. 34 is a sectional plan view of a nineteenth embodiment of the fastener support means.

In the embodiment in FIG. 34, the rivet support means 2340 has two substantially U-shaped rods or bars 2360 where each has two points of contact with the rivet 2317.

Figures 35, 36:
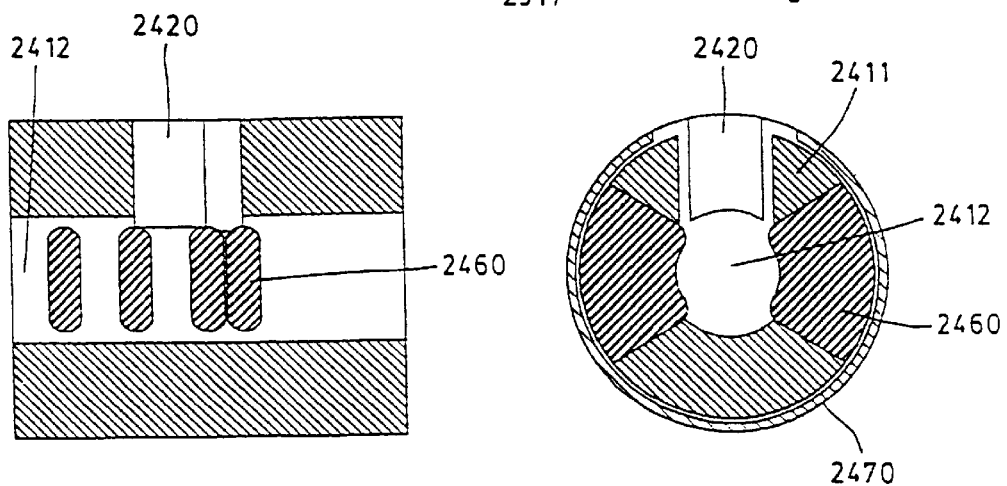
FIG. 35 is an axial section through the nose piece of a further embodiment.
FIG. 36 is a transverse section of the nose piece of FIG. 35.

FIGS. 35 and 36 show another embodiment wherein the rivet engaging guide or orienting means comprise plate-like pieces 2460 inserted into complementary slots in the nose piece 2411. A surrounding clamp or containing spring 2470 holds the pieces 2460 in place.

The embodiments of FIGS. 35 and 36 permit construction with material removed from the nose piece in a pattern which permits a different approach to size reduction whilst retaining strength in the nose piece. The segments 2460 which project into passage 2412 are able to be produced with a variety of thicknesses and resiliences which are interrelated with parameters such as degree of contact with the rivet and the geometry of the section projected into passage 2412. The character of pieces 2460 at the point of contact with the rivet is to provide the desired guiding/orientation function and this may be achieved with a range of sectional geometries, such as bevelling on the edge, adaptations such as slotting to produce fingers, and shaping to provide nodes and pointlike contacts.

As stated above, it may be preferred that the pins, rods, fingers, etc. have roughened contact points/faces, or peripheral grooves, or slots as these will tend to oppose unwanted tilting of the rivets before engagement during advancement by the punches.

As will be readily apparent to the skilled addressee, the present invention enables the rivets or other fasteners to be accurately fed to the fastening heads of the machines by tape, gravity or blow-feeding, and the fasteners are accurately supported until engagement and advancement by the punches.

Sensors (eg. limit switches, proximity switches, light beams/photocells) (see FIG. 1) can be provided to ensure that a rivet or other fastener is provided in the delivery passage before the punch is advanced.

Various changes and modifications may be made to the embodiments described and illustrated without departing from the scope of the present invention defined in the appended claims.

We claim:

1. A setting tool for a fastening machine, the setting tool being operable without a preclamp function and comprising:

a nose piece with a fastener delivery passage therein and a fastener feed mechanism to advance fasteners to the delivery passage;

a fastener actuator slidably mounted for movement through the delivery passage to move a fastener therefrom to a work piece to be fastened thereby;

an actuator advancer to advance the fastener actuator through the fastener delivery passage to deliver fasteners to an opening in an end of the fastener delivery passage;

a fastener supporter comprising a plurality of rows axially aligned with the fastener delivery passage, each row presenting a series of resiliently actionable nodes therealong, the plurality of rows being spaced angularly about a circumference of the fastener delivery passage;

said fastener supporter being provided along a side wall of the fastener delivery passage to guide and maintain orientation of the fastener while the fastener is moved through the fastener delivery passage by the fastener actuator, the fastener supporter extending axially along the fastener delivery passage and presenting a series of contact points at which an extended head portion of a fastener is contacted upon passing through the fastener delivery passage to guide and orient the fastener, and wherein each row of nodes is formed by a series of balls mounted resiliently in a wall of the fastener delivery passage along slots in the wall of the fastener delivery passage, with a portion of each ball projecting into the fastener delivery passage, each ball being pressed towards the fastener delivery passage by a spring or block of resilient material extending behind the ball, a first ball of each series of balls along the fastener delivery passage being free to move along an axial direction of the fastener delivery passage and being resiliently biased to adjoin a second ball in its respective series of balls.

2. A setting tool as claimed in claim 1, further comprising:

a fastener centralizer at the opening of the fastener delivery passage to centralize the fastener at the work piece.

3. A setting tool as claimed in claim 2, wherein:

the fastener centralizer is a ring of radially sprung balls arranged about the opening of the fastener delivery passage.

4. A setting tool as claimed in claim 1, wherein:

the fasteners are fed to the fastener delivery passage via a tape which is fed over a feed end of the fastener delivery passage, the fasteners being mounted in the tape for alignment with the fastener delivery passage prior to action of the fastener actuator to drive the fasteners into and through the fastener delivery passage.

5. A setting tool as claimed in claim 1, wherein:
the fasteners are fed to the fastener delivery passage via a port in a side wall of the passage, and the fasteners are engaged by the fastener supporter prior to action of the fastener actuator.

6. A setting tool as claimed in claim 5, wherein:
the fasteners are blown into the fastener delivery passage via the port by compressed air.

7. A setting tool as claimed in claim 1, wherein the fastener actuator is a punch, the fastener is a rivet and the fastener supporter provides rivet head contact as a rivet is passed therethrough at axial spacings less than the axial length of the rivet.

8. A setting tool as claimed in claim 7, wherein the rivet has a short shank, and the fastener supporter prevents tumbling of the rivet.

9. A setting tool as claimed in claim 7, wherein the fastener supporter actively engages a head of the rivet repetitively along a length of the passage to jog the rivet to a desired orientation.

10. A setting tool as claimed in claim 7, wherein the fastener supporter receives and holds the rivet prior to engagement by the punch and maintains the rivet orientation as the rivet passes along the passage.

11. A setting tool as claimed in claim 1, wherein the fastener supporter jogs the head of the rivet as the rivet passes therethrough to maintain axial alignment or to engage a stem of the rivet as the rivet tumbles to prevent excessive tilt of the rivet.

12. A setting tool as claimed in claim 1, wherein the nose piece has reduced dimensions to permit actioning of fasteners in confined environments.

13. A setting tool as claimed in claim 1, wherein the fastener is a rivet, and the fastener supporter engages both a stem and a head of a rivet being advanced by the fastener actuator.

14. A setting tool for a fastening machine, the setting tool being operable without a preclamp function and comprising:
a nose piece with a fastener delivery passage therein and a fastener feed mechanism to advance fasteners to the delivery passage;
a fastener actuator slidably mounted for movement through the delivery passage to move a fastener therefrom to a work piece to be fastened thereby;
an actuator advancer to advance the fastener actuator through the fastener delivery passage to deliver fasteners to an opening in an end of the fastener delivery passage;
a fastener supporter comprising a plurality of rows axially aligned with the fastener delivery passage, each row presenting a series of resiliently actionable nodes therealong, the plurality of rows being spaced angularly about a circumference of the fastener delivery passage, said fastener supporter being provided along a side wall of the fastener delivery passage to guide and maintain orientation of the fastener while the fastener is moved through the fastener delivery passage by the fastener actuator, the fastener supporter extending axially along the fastener delivery passage and presenting a series of contact points at which an extended head portion of a fastener is contacted upon passing through the fastener delivery passage to guide and orient the fastener; and
wherein each row of nodes is formed by a series of balls mounted resiliently in a wall of the fastener delivery passage along slots in the wall of the fastener delivery passage, with a portion of each ball projecting into the fastener delivery passage, a first pair of balls in a row of balls adjoining each other and the remaining balls being spaced apart by a distance which is smaller than an axial length of the fastener.

15. A setting tool as claimed in claim in claim 14, further comprising:
a fastener centralizer at the opening of the fastener delivery passage to centralize the fastener at the work piece.

16. A setting tool as claimed in claim 15, wherein:
the fastener centralizer is a ring of radially sprung balls arranged about the opening of the fastener delivery passage.

17. A setting tool as claimed in claim 14, wherein:
the fasteners are fed to the fastener delivery passage via a tape which is fed over a feed end of the fastener delivery passage, the fasteners being mounted in the tape for alignment with the fastener delivery passage prior to action of the fastener actuator to drive the fasteners into and through the fastener delivery passage.

18. A setting tool as claimed in claim 14, wherein:
the fasteners are fed to the fastener delivery passage via a port in a side wall of the passage, and the fasteners are engaged by the fastener supporter prior to action of the fastener actuator.

19. A setting tool as claimed in claim 18, wherein:
the fasteners are blown into the fastener delivery passage via the port by compressed air.

20. A setting tool as claimed in claim 14, wherein the fastener actuator is a punch, the fastener is a rivet and the fastener supporter provides rivet head contact as a rivet is passed therethrough at axial spacings less than the axial length of the rivet.

21. A setting tool as claimed in claim 20, wherein the rivet has a short shank, and the fastener supporter prevents tumbling of the rivet.

22. A setting tool as claimed in claim 20, wherein the fastener supporter actively engages a head of the rivet repetitively along a length of the passage to jog the rivet to a desired orientation.

23. A setting tool as claimed in claim 20, wherein the fastener supporter receives and holds the rivet prior to engagement by the punch and maintains the rivet orientation as the rivet passes along the passage.

24. A setting tool as claimed in claim 14, wherein the fastener supporter jogs the head of the rivet as the rivet passes therethrough to maintain axial alignment or to engage a stem of the rivet as the rivet tumbles to prevent excessive tilt of the rivet.

25. A setting tool as claimed in claim 14, wherein the nose piece has reduced dimensions to permit actioning of fasteners in confined environments.

26. A setting tool as claimed in claim 14, wherein the fastener is a rivet, and the fastener supporter engages both a stem and a head of a rivet being advanced by the fastener actuator.

27. A setting tool for a fastening machine, the setting tool being operable without a preclamp function and comprising:
a nose piece with a fastener delivery passage therein and a fastener feed mechanism to advance fasteners to the delivery passage;
a fastener actuator slidably mounted for movement through the delivery passage to move a fastener therefrom to a work piece to be fastened thereby;
an actuator advancer to advance the fastener actuator through the fastener delivery passage to deliver fasteners to an opening in an end of the fastener delivery passage; and a fastener supporter comprising a plurality of rows axially aligned with the fastener delivery passage, each row presenting a series of resiliently actionable nodes therealong, the plurality of rows being spaced angularly about a circumference of the fastener delivery passage, the fastener supporter being provided along a side wall of the fastener delivery passage to guide and maintain orientation of the fastener while the fastener is moved through the fastener delivery passage by the fastener actuator, and wherein the fastener supporter is a series of balls arranged to project into the fastener delivery passage, at least one uppermost ball being axially movable with respect to the fastener delivery passage by an air blast or a solenoid.

28. A setting tool as claimed in claim 27, further comprising:

a fastener centralizer at the opening of the fastener delivery passage to centralize the fastener at the work piece.

29. A setting tool as claimed in claim 28, wherein:

the fastener centralizer is a ring of radially sprung balls arranged about the opening of the fastener delivery passage.

30. A setting tool as claimed in claim 27, wherein:

the fasteners are fed to the fastener delivery passage via a tape which is fed over a feed end of the fastener delivery passage, the fasteners being mounted in the tape for alignment with the fastener delivery passage prior to action of the fastener actuator to drive the fasteners into and through the fastener delivery passage.

31. A setting tool as claimed in claim 27, wherein:

the fasteners are fed to the fastener delivery passage via a port in a side wall of the passage, and the fasteners are engaged by the fastener supporter prior to action of the fastener actuator.

32. A setting tool as claimed in claim 31, wherein:

the fasteners are blown into the fastener delivery passage via the port by compressed air.

33. A setting tool as claimed in claim 27, wherein the fastener actuator is a punch, the fastener is a rivet and the fastener supporter provides rivet head contact as a rivet is passed therethrough at axial spacings less than the axial length of the rivet.

34. A setting tool as claimed in claim 33, wherein the rivet has a short shank, and the fastener supporter prevents tumbling of the rivet.

35. A setting tool as claimed in claim 33, wherein the fastener supporter actively engages a head of the rivet repetitively along a length of the passage to jog the rivet to a desired orientation.

36. A setting tool as claimed in claim 27, wherein the fastener supporter receives and holds the rivet prior to engagement by the punch and maintains the rivet orientation as the rivet passes along the passage.

37. A setting tool as claimed in claim 27, wherein the fastener supporter jogs the head of the rivet as the rivet passes therethrough to maintain axial alignment or to engage a stem of the rivet as the rivet tumbles to prevent excessive tilt of the rivet.

38. A setting tool as claimed in claim 27, wherein the nose piece has reduced dimensions to permit actioning of fasteners in confined environments.

39. A setting tool as claimed in claim 27, wherein the fastener is a rivet and the fastener supporter engages both a stem and a head of a rivet being advanced by the fastener actuator.

\* \* \* \* \*